United States Patent [19]

Uchiyama et al.

[11] 4,199,239
[45] Apr. 22, 1980

[54] CAMERA

[75] Inventors: Takashi Uchiyama, Yokohama; Ryoichi Suzuki, Kawasaki; Fumio Ito, Yokohama; Wataru Nagasaka, Tokyo; Youichi Okuno; Mutsuhide Matsuda, both of Yokohama, all of Japan

[73] Assignee: Canon Kabushiki Kaisha, Tokyo, Japan

[21] Appl. No.: 775,886

[22] Filed: Mar. 9, 1977

[30] Foreign Application Priority Data

Mar. 12, 1976 [JP] Japan .................................. 51-27571
Mar. 12, 1976 [JP] Japan .................................. 51-27572

[51] Int. Cl.² .................... G03B 17/04; G03B 17/52
[52] U.S. Cl. .................................. 354/86; 354/21; 354/173; 354/174; 354/187; 354/198; 354/288
[58] Field of Search .............. 354/25, 83, 174, 187, 354/188, 195, 198, 276, 288, 21, 60 R, 84, 85, 86, 173

[56] References Cited

U.S. PATENT DOCUMENTS

| | | | |
|---|---|---|---|
| 301,266 | 5/1943 | Küppenbender et al. | 354/187 |
| 2,421,396 | 6/1947 | Schwartz et al. | 354/174 |
| 3,979,763 | 9/1976 | Mills | 354/187 |
| 4,000,500 | 3/1976 | Ivester et al. | 354/83 X |

Primary Examiner—Michael L. Gellner
Attorney, Agent, or Firm—Toren, McGeady and Stanger

[57] ABSTRACT

A camera wherein a front housing which contains a photographing optical system, an exposure device, etc. is connected by a foldable connecting device such as a bellows or the like to a rear housing which contains a photosensitive material to be exposed to light, a view finder optical system, etc. During photographing, the foldable connecting device is stretched to adjust the distance between the front and rear housings to a distance suitable for photographing. When the camera is not in use, the connecting device is contracted to being the front and rear housings very close to each other. An electrical wiring arrangement of a flexible material is either provided on the surface of the bellows or formed together with the bellows as an integral part of the bellows when it is formed in such a way as to be stretchable and contractable together with the bellows, the wiring service to electrically connect the components disposed in the front housing to those disposed in the rear housing. In our embodiment, a main switch disposed in the rear housing is operable from a switch control device in the front housing when the bellows is fully expanded.

11 Claims, 11 Drawing Figures

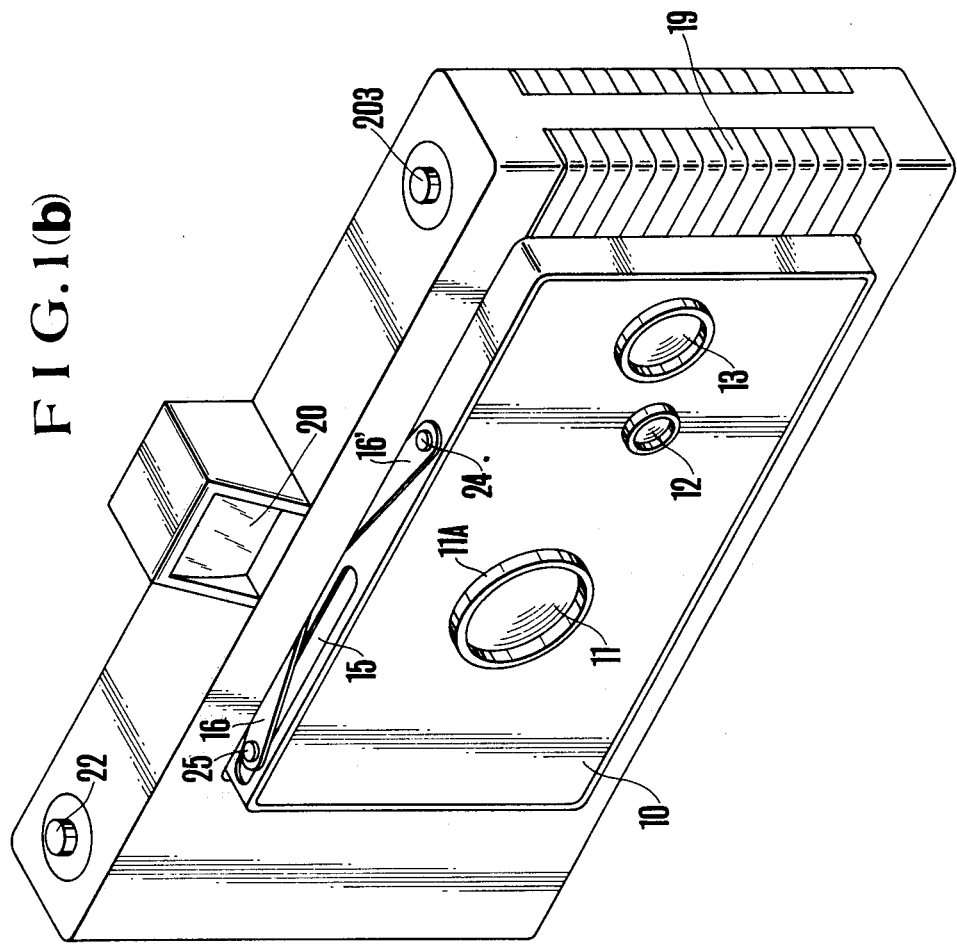

CAMERA

BACKGROUND OF THE INVENTION

1. Field of the Invention

This invention relates to a camera.

2. Description of the Prior Art

There have been proposed many cameras of the type wherein a front housing which contains a photographing optical system, an exposure device, etc. is connected by a foldable connecting device such as a bellows or the like to a rear housing which contains a photosensitive material to be exposed to light, a view finder optical system, etc.; in photographing, the foldable connecting device is stretched to adjust the distance between the front and rear housings to a distance suitable for photographing; when the camera is not in use, the connecting device is contracted to bring the front and rear housings very close together to make the camera compact for improved portability.

Arrangement of this type is more often seen in so-called instant photograph cameras that use a sheet-like photosensitive material of a self-development processing type. An example of such a self-development-processing type sheet-like photosensitive material is disclosed in the specification of U.S. Pat. No. 3,682,076. According to this U.S. patent, a bag containing a self-development processing liquid is contained in the sheet-like photosensitive material. After exposure of the material to light, the bag containing the liquid is broken when the photosensitive material is carried to the outside of the camera passing between a pair of pressing rolls disposed inside the camera. Then, the development processing liquid is spread over the surface of the photosensitive material to effect a self-development process. A plurality of sheets of such a photosensitive material are piled up inside a film cartridge and the camera is loaded with the photosensitive material with the film cartridge placed inside a rear housing. In the case of a photosensitive material that is used for ordinary cameras, the material is used only for the purpose of forming thereon a negative image, which is then enlarged and is used for forming a positive image on printing paper. However, such a method does not apply to this self-development-processing sheet-like photosensitive material. A positive image is formed directly on the exposed photosensitive surface of the material; and the image is intended to be appreciated without being enlarged. Therefore, the surface of the photosensitive material must be sufficiently large for appreciation of the image formed thereon. For this reason, the size of the sheet-like photosensitive material of the self-development-processing type is arranged to be much larger than the sizes of 35 mm roll film, etc. Accordingly, the size of an instant photograph camera which uses such a photosensitive material is much greater than the ordinary camera that uses 35 mm roll film and is substantially disadvantageous in terms of portability.

In order to overcome such disadvantage, therefore, the instant photograph cameras in general are arranged to use a foldable connecting device such as bellows for connecting a front housing which contains a photographing optical system, an exposure device, etc. to a rear housing which contains the sheet-like photosensitive material, a view finder optical system, etc.; for photographing, the connecting device is stretched to adjust distance between the front and rear housings to a distance suitable for photographing; then, when the camera is not in use, the connecting device is contracted to bring the front and rear housings very close to each other to make the camera compact for carrying.

A camera of this type is divided into a front housing and a rear housing with a foldable connecting device such as bellows employed for connecting these two housings, because: In order to control light passing through a photographing lens which is provided in the front housing for exposure, an exposure device must be disposed in the front housing. On the other hand, it is generally required for a camera nowadays to have an automatic focussing device which permits automatic focussing without manual focussing adjustment so that a focussing failure that otherwise might result from manual adjustment can be prevented. However, where a camera is provided with such an automatic focussing device, the automatic focussing device is disposed in the front housing because it must be used for adjusting the position of the photographing lens on the optical axis thereof. Then, when the front housing thus arranged to contain various devices that must be disposed therein, the size of the front housing becomes large. In order to make the camera sufficiently compact, the rear housing is required to have some sort of accommodation to absorb an excessive portion in the front housing. Otherwise, it is impossible to make the camera sufficiently compact. However, the conventional cameras of the above stated type have been provided with no such accommodation for absorbing the excessively large size of the front housing.

Further, it has become very popular to provide a camera with an exposure control electric circuit using a photoelectric element. However, the above stated foldable type cameras are lagging behind other types of camera in respect to arrangement for automatic exposure control. To enable a camera of this type to perform automatic exposure control, a rear housing which contains, for example, a battery, a shutter circuit, etc. must be electrically connected to a front housing which contains a lens shutter to be controlled. In the case of a camera wherein no lens shutter is used, it is conceivable to automatically control a diaphragm disposed at the lens. Then, if the camera is provided with such an automatic diaphragm to be controlled, the front housing must be electrically connected to the rear housing. However, with electric wiring provided between the front and rear housings to connect them to each other in a foldable camera, the wiring hinders a foldable connecting device from being folded. Accordingly, this necessitates provision of a means for preventing such hindrance.

In order that a camera of the above stated type is made to be as small as possible, a power source battery which is provided for operating various mechanisms also must be as small as possible. Accordingly, in a camera which is equipped with, for example, an exposure control electric circuit, an automatic carrying-out device which automatically carries a sheet-like photosensitive material to the outside of the camera, an automatic focussing device, etc., it is desirable to provide a safety device which minimizes power consumption and prevents the power of the battery from being wasted by prohibiting the operations of these various devices when the camera is not loaded with the sheet-like photosensitive material. With such a safety device incorporated in the camera, however, it becomes difficult for the manufacturers, retailers or purchasers of the camera to test the actual performance and the operating accuracy of the camera without loading it with a photosensitive material. Thus, the use of such safety device makes it impossible to conduct ordinary tests. This is indeed great inconvenience.

SUMMARY OF THE INVENTION

The first object of this invention is to provide a camera which solves the problems of the conventional cameras described in the foregoing.

The second object of this invention is to provide a camera which can be rendered extremely compact when not in use.

The third object of this invention is to provide a foldable camera wherein electric wiring which connects a front housing to a rear housing does not cause any hindrance to the folding operation of the camera.

The fourth object of this invention is to provide a camera which permits testing by releasing a safety device even where such a device is arranged to prohibit electrically operative components contained inside the camera from operating when the camera is loaded with no photosensitive material.

The fifth object of this invention is to provide a camera which permits the use of a self-development-processing type sheet-like photosensitive material and which is capable of performing an automatic focussing operation.

These and other objects of the invention will become apparent by reference to the following detailed description when considered in connection with the accompanying drawings.

DESCRIPTION OF THE PREFERRED EMBODIMENTS

The following is the detailed description of some preferred embodiments of this invention as applied to cameras that permit the use of a self-development processing type sheet-like photosensitive material. For the cameras described herein as preferred embodiment of this invention, the use of a self-development processing type sheet-like photosensitive material such as the one disclosed in the specification of U.S. Pat. No. 3,682,076 is suitable. Namely, it is suitable to use such a material that possesses therein a bag which contains a self-development processing liquid and which is broken when the material is carried to the outside of the camera passing through a gap between a pair of pressing rolls thereby allowing the development processing liquid to spread over the surface of the photosensitive material thus effecting the self-development process thereby.

Figure 1A:
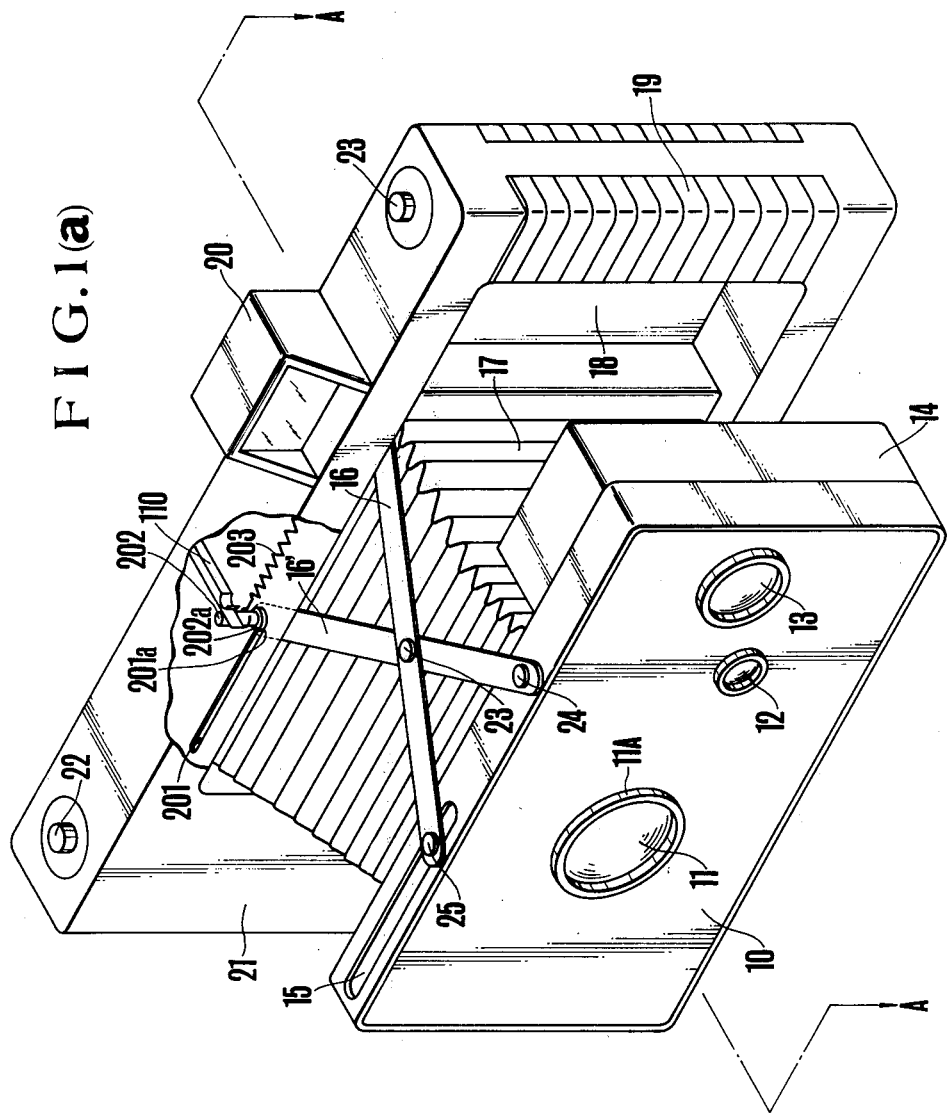
FIGS. 1(a) and (b) are oblique views illustrating a camera as an embodiment of this invention, FIG. 1(a) illustrating the camera as in an operative state and FIG. 1(b) illustrating it as in a state of being not in use.

Referring to FIGS. 1(a) and (b) which are oblique views illustrating the appearance of a camera as an embodiment of this invention, a foldable connecting device (16, 16', 17, 23, 24 and 25) is used for connecting a front housing 10 to a rear housing 21. In carrying out a photographing operation, the connecting device is stretched out as illustrated in FIG. 1(a) to adjust the distance between the front and rear housings to a distance suitable for photographing. When the camera is not in use for photographing, the connecting device is contracted as illustrated in FIG. 1(b) to bring the front and rear housings very close to each other to make the camera compact for improved portability thereof.

In FIG. 1, a reference numeral 11 indicates a photographing lens disposed inside a lens barrel 11A which is placed in and carried by the front housing 10; 12 indicates a condenser lens assembly disposed in front of an auxiliary diaphragm which will be described hereinafter, the condenser lens assembly being carried by the front housing 10; 13 indicates an image forming lens assembly provided for an automatic focussing device which will be described hereinafter, the image forming lens assembly being carried also by the front housing; 14 indicates a control box which is disposed behind the front housing, i.e. disposed between the front and rear housings and which is secured to the front panel with the automatic focussing device and an automatic exposure shutter device (will be described hereinafter) being arranged inside the control box 14; 15 indicates a slot provided in a side wall of the front housing 10; 18 indicates a recess provided in the rear housing 21 for accommodating the control box 14 therein when the connecting device is folded to bring the front and rear housings into close contact with each other, the recess 18 thus serving to make closer contact of the two housings with each other possible; 19 indicates a grip part provided on the rear housing 21, the grip part being arranged in such a manner that, when the connecting device is stretched and the control box 14 which is fixed to the front housing 10 is removed from the recess 18, the grip by a camera operator becomes easier with the fingers of the operator hooked into the recess 18 through the grip part 19; 20 indicates a frame of a view finder; 22 indicates a shutter button which is provided for operating the automatic exposure shutter device from the outside of the camera; and 203 indicates a control button for operating the automatic focussing device from the outside of the camera.

A reference numeral 17 indicates bellows which is disposed between the front and rear housings and is capable of shielding the inside of the rear housing from unnecessary external light; and 16 and 16' indicate levers used for firmly connecting the front and rear housings to each other. One end of the lever 16 is rotatably held by an unillustrated pin planted in the rear housing 21 while the other end of the lever 16 engages with the slot 15 provided in the front housing 10 with a pin 25 provided at this end of the lever to be slidable inside the slot. One end of the lever 16' is rotatably held by a pin 24 planted in the front housing 10 while the other end of the lever 16' engages with a slot 201 provided in the rear housing 21 with a pin 202 provided at this end to be slidable inside the slot 201. A foldable connecting device is formed by the levers 16 and 16', the bellows 17 and pins 23, 24 and 25. A reference numeral 203 indicates a tension spring one end of which engages with the pin 202 while the other end engages with the rear housing 21, the spring 203 thus being arranged to constantly urge the connecting device to move in the stretching direction; and 110 indicates a main switch which controls electric currents to be supplied to various electrically operative components disposed inside the camera. When the camera is brought into a photographing state by stretching the foldable connecting device, the main switch 110 is closed by the pressing pressure of the pin provided on the lever 16'. When the connecting device is folded with the camera not in use, the main switch 110 is relieved from the pressure of the lever 16' and is opened thereby.

Figure 2A:
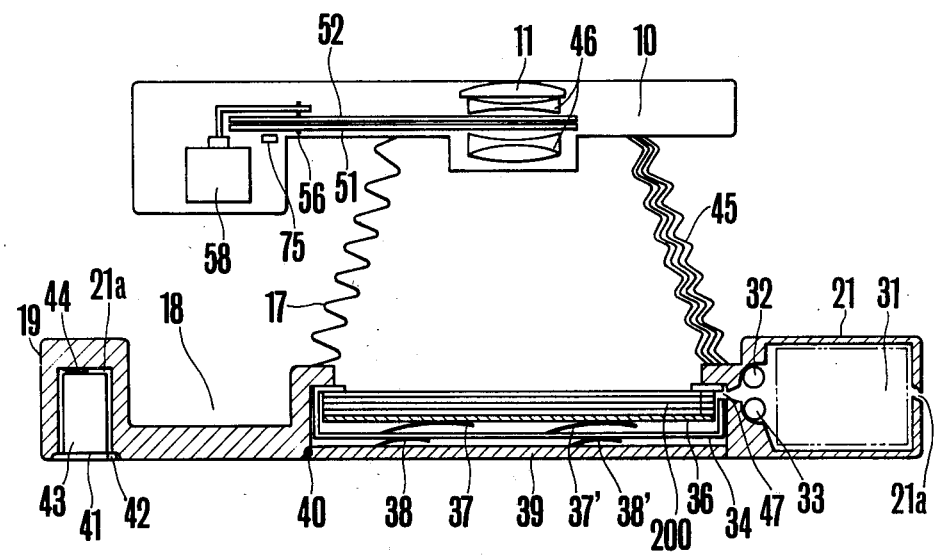
FIG. 2(a) is a sectional view illustrating the camera of FIG. 1 across the A—A line indicated in FIG. 1(a).
Figure 2B:
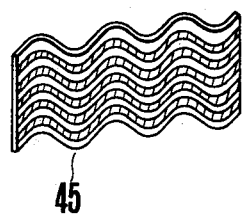
FIG. 2(b) is a greatly enlarged detailed view illustrating a printed wiring board 45 shown in FIG. 2(a).

FIG. 2(a) is a sectional view across the A—A line indicated in FIG. 1(a) illustrating relative positions of essential components arranged inside the camera. In FIG. 2(a), a reference numeral 200 indicates a self-development-processing type sheet-like photosensitive material such as the one disclosed in the specification of U.S. Pat. No. 3,682,076; 34 indicates a film cartridge which contains a plurality of sheets of the sheet-like photosensitive material 200 piled therein one on top of another and which is placed inside a cartridge receiving chamber provided in the rear housing 21; 36 indicates a pressing plate disposed beneath the piled-up sheets of the photosensitive material inside the film cartridge 34; 37 and 37' indicate plate springs which push the pressing plate 36 against the sheet-like photosensitive material 200; 38 and 38' indicate plate springs provided for the purpose of setting the film cartridge into a preset position; 39 indicates an opening and closing lid disposed on the rear of the rear housing 21 to permit inserting and removing the cartridge 34 into and from the cartridge receiving chamber, the lid 39 being hinged on a pin 40 secured to the rear housing 21; 43 indicates a battery placed inside a battery chamber 21a provided in the rear housing 21; 41 indicates a lid which opens and closes to permit inserting and removing the battery into and from the battery chamber 21a, the lid 41 being hinged on a pin 42 secured to the rear housing 21; 44 indicates a spring provided for the purpose of preventing the battery 43 from being vibrated; 31 indicates a part in which there is provided a photosensitive material carrying-out mechanism for taking out exposed sheets of the photosensitive material 200 one after another from inside of the cartridge 34 through a photosensitive material discharge port 21a; and 32 and 33 indicate a pair of pressing rolls which rotate in response to the operation of the photosensitive material carrying-out mechanismm for taking out an exposed sheet of the material 200 from the rear housing. In this manner, when the photosensitive material carrying-out mechanism works to take out an exposed sheet of the photosensitive material 200 to the outside of the rear housing, the exposed sheet of material 200 which is being taken out through an opening 47 of the film cartridge 34 comes to pass between the rolls 32 and 33 before it is discharged through the photosensitive material discharge port 21a to the outside of the rear housing. When the sheet is passing between the rolls 32 and 33, a bag which contains a self-development processing liquid and which is placed inside the sheet is broken to allow the liquid to flow out and the self-development process is accomplished on the sheet by the outflow of the liquid. However, the arrangement of the photosensitive material carrying-out mechanism employing such means of accomplishing the self-development process does not constitute an essential part of this invention and, for example, a photosensitive material carrying-out arrangement such as the one disclosed in the specification of U.S. Pat. No. 3,689,262 is applicable to such a purpose. A reference numeral 45 indicates a flexible printed wiring board a part of which is enlarged in FIG. 2(b) to illustrate its details. The printed wiring board 45 is either stuck to the inside of the bellows 17 or may be formed together with the bellows as one body. The printed wiring board is used for electrically connecting the components disposed inside the rear housing such as a battery 43, a photosensitive material carrying mechanism driving motor, etc. to the components disposed inside the front housing 10 such as an ampare meter provided for driving and controlling a shutter, a motor for driving an automatic focussing device, etc. A reference numeral 46 indicates a lens which constitutes a photographing optical system together with the above stated lens 11; 51 and 52 indicate shutter blades of a known half-opening type shutter which performs combined functions as shutter and disphragm; 75 indicates a light receiving member disposed behind the shutter blades 51 and 52; and 58 indicates an ampare meter provided for driving and controlling the shutter.

Figure 3A:
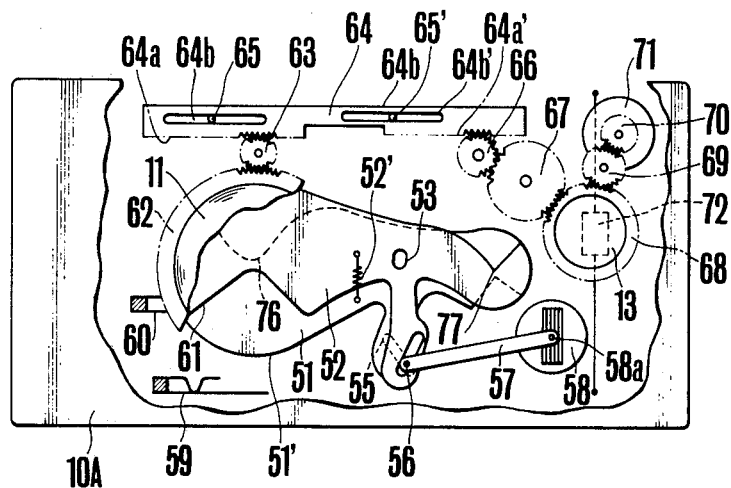
FIGS. 3(a) and (b) are partial cutaway views of a front housing illustrating the details of a shutter control device and an automatic focussing device provided inside the front housing, FIG. 3(a) being a plan view as viewed from the front of the camera and FIG. 3(b) being an oblique view thereof.
Figure 3B:
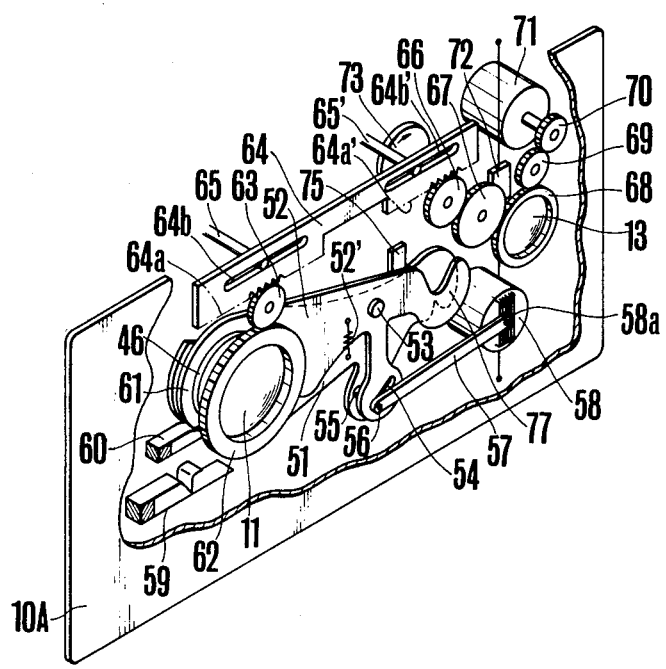

FIGS. 3(a) and (b) illustrate the details of the shutter control device and the automatic focussing device shown in FIGS. 1 and 2. FIG. 3(a) is a plan view illustrating the camera as viewed from the front and FIG. 3(b) an oblique view thereof. In FIGS. 3(a) and (b), a reference numeral 10A indicates a base plate secured to the front housing 10; and 51 and 52 indicate the shutter blades of a half-opening type shutter. The shutter blades 51 and 52 are rotatably held by a pin 53 which is secured to the base plate 10A. At the ends of these shutter blades across the pin 53, there are formed main diaphragm portions 76 and 76' of these shutter blades 51 and 52 and auxiliary diaphragm portions 77 and 77' thereof respectively. The main diaphragm portions of the shutter blades 51 and 52 are disposed behind the photographing optical system 11 while the auxiliary diaphragms 77 and 77' are disposed behind the condenser lens system 12. Slots 54 and 55 are provided in the shutter blades 51 and 52. A pin 56 which is secured to one end of a lever 57 is inserted into these slots 54 and 55 while the other end of the lever 57 is secured to a moving coil shaft 58a of an ampare meter 58. When the moving coil shaft 58a of the ampare meter 58 rotates clockwise, the shutter blades 51 and 52 rotate counterclockwise. Then, the shutter aperture which is formed by the main diaphragm portion 76 and 76' and an auxiliary aperture which is formed for a photometric purpose by the auxiliary diaphragm portions are gradually narrowed by the counterclockwise rotation of the shutter blades respectively. A reference numeral 52' indicates a tension spring one end of which engages with the shutter blade 51 while the other end engages with the shutter blade 52. The spring 52' constantly urges these shutter blades 51 and 52 to rotate in the direction of narrowing the apertures formed by the main diaphragm portions 76 and 76' and by the auxiliary diaphragm portions 77 and 77'. A reference numeral 60 indicates a switch member which is secured to the base plate 10A. The switch member 60 is turned on being pushed by the tip 60 of the shutter blade 52 when the shutter blades 51 and 52 are closed and in turned off being relieved from the pushing force of the tip 61 of the shutter blade 52 when these shutter blades 51 and 52 are opened. A reference numeral 59 indicates a switch member secured to the base plate 10A of the front housing 10. The switch member 59 is turned off being pushed by a side portion 51' of the shutter blade 51 when the shutter blades 51 and 52 are fully opened and is instantly turned on when the shutter blades 51 and 52 begin to close with power supply to the ampare meter cut off. A reference numeral 75 indicates a light receiving element such as CdS or the like which is disposed behind the auxiliry diaphragm portions 77 and 77' of the shutter blades 51 and 52. The light receiving element 75 detects the quantity of light passed through the auxiliary diaphragm portions 77 and 77' and produces an electric signal output corresponding to the detecting quantity of light.

The foregoing description has covered the arrangement of the shutter control device of the invented camera. Now, the arrangement of the automatic focussing device of the camera is as follows: A reference numeral 71 indicates a motor provided for driving the automatic focussing device; 70 indicates a toothed wheel secured to the rotating shaft of the driving motor 71; 68 indicates a toothed wheel secured to a lens barrel which is carrying the image forming lens 13, the wheel 68 being so arranged as to shift the position of the image forming lens 13 on the optical axis when the wheel 68 is rotated; and 72 indicates a photo-electric converting element which is fixed at a position corresponding to an image forming plane of the image forming lens 13. The element 72 produces an electric signal corresponding to the sharpness of the image formed on the surface of the element 72. An element such as CdS that is generally used for a focussing device in a camera may be employed as the element 72. A reference 67 indicates a toothed wheel rotatably held by a shaft secured to the base plate 10A, the wheel 67 being arranged to be constantly in engagement with another toothed wheel 68; 66 indicates a toothed wheel which is rotatably held by a shaft secured to the base plate 10A and which is arranged to be constantly in engagement with the toothed wheel 67; 62 indicates a toothed wheel which is secured to the photographing lens barrel 11A and which serves to move the photographing lens on the optical axis when the lens barrel 11A is rotated for focussing; 63 indicates a toothed wheel rotatably held by a shaft secured to the base plate 10A, the wheel 63 being arranged to be constantly in engagement with the wheel 62; and 64 indicates a rack member having slots 64b and 64b' which engage with pins 64 and 65' secured to the base plate 10A and toothed parts 64a and 64a' which constantly engage with the toothed wheels 63 and 66, the rack member thus serving to transmit the driving force of the motor 71 to the toothed wheel 62.

Figure 4:
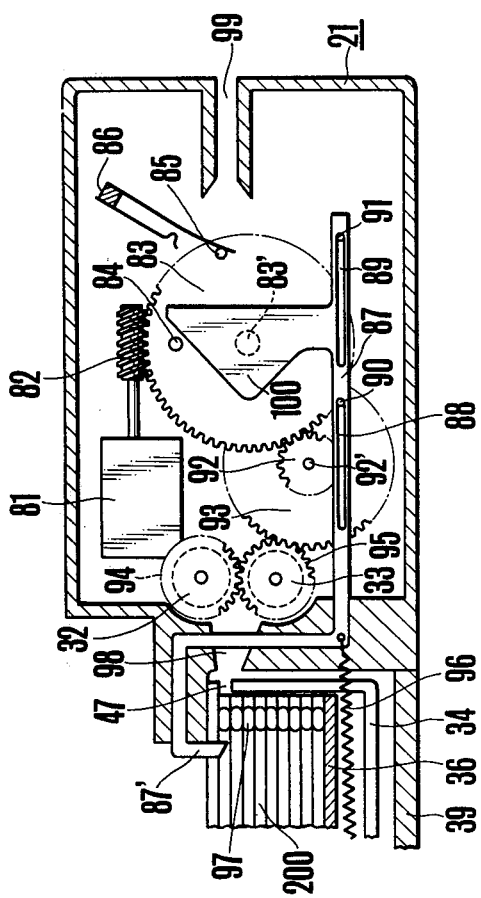
FIG. 4 is a plan view partially illustrating in detail a sheet-like photosensitive material carrying-out device of the camera illustrated in FIGS. 1 and 2.

FIG. 4 is a plan view illustrating the details of the sheet-like photosensitive material carrying-out device shown in FIGS. 1 and 2. In this drawing, a reference numeral 81 indicates a motor secured to the rear housing 21; 82 indicates a worm wheel secured to the rotating shaft of the motor 81; 83 indicates a toothed wheel rotatably held by a shaft 83' secured to the rear housing 21, the wheel 83 being arranged to constantly engage with the worm wheel 83; 84 and 85 indicate pins provided on one side of the wheel 83; 92 and 93 indicate toothed wheels which are secured to a shaft 92' rotatably held by the rear housing 21, the wheel 92 being in constant engagement with the wheel 83; 95 indicates a toothed wheel which is secured to the shaft of the pressing roll 33 to rotate together with the roll 33 and which is arranged to constantly engage with the wheel 93; 94 indicates a toothed wheel which is secured to the shaft of the pressing roll 32 to rotate together with the roll 32 and which is arranged to constantly engage the wheel 95; and 87 indicates a photosensitive material carrying lever which is movable to the right and left directions through the slots 88 and 89 which engage with pins 90 and 91 secured to the rear housing 21. At the tip of the lever 87, there is provided a forwarding claw 87' which serves to feed an exposed sheet of the photosensitive material 200 to a gap between the pressing rolls 32 and 33. A tension spring 96 which engages with the rear housing 21 at one end thereof and with a part of the lever 87 at the other end thereof constantly urges the lever 87 to move to the left direction as viewed in FIG. 4. The lever 87 is provided with a triangular shaped protrudent cam portion 100. The cam portion 100 of the photosensitive material carrying lever 87 engages with the pin 84 provided on the wheel 83 but does not engage with another pin 85 also provided there when the wheel 83 rotates. With the wheel 83 rotated clockwise, the pin 84 pushes the protrudent cam 100 to the right. This causes the lever 87 to move to the right direction until the wheel 83 makes a half turn. Then, the claw 87' of the lever 87 engages with a guide tab 97 of the exposed sheet of the photosensitive material 200 to pull out the sheet through a passage 98 to the gap between the pressing rolls 32 and 33. A reference numeral 86 indicates a switch which is secured to the rear housing 21. One of the electrode contact pieces of the switch 86 is extended to be within the rotating locus of the pin 85 on the wheel 83 to cut off the power supply to the motor 81 with the pin 85 when the wheel 83 completes one turn thereof.

Figure 5:
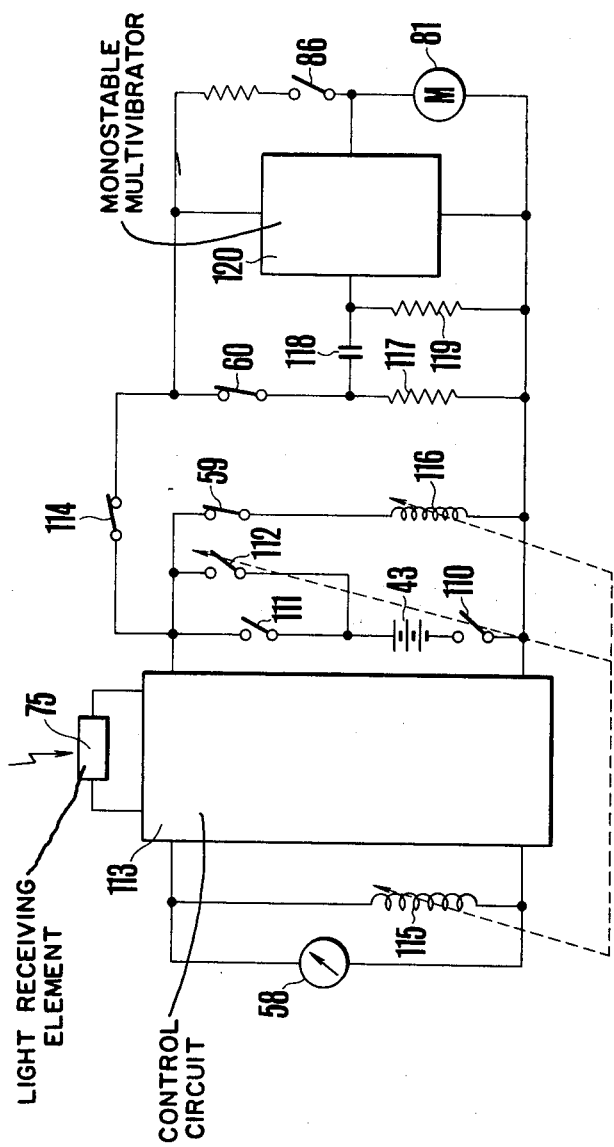
FIG. 5 is a circuit diagram illustrating an electric circuit provided for the purpose of controlling the shutter control device and the sheet-like photosensitive material carrying-out device illustrated in FIGS. 3 and 4.

FIG. 5 illustrates an electrical circuit for controlling the shutter control device and the sheet-like photosensitive material carrying-out device of the camera of this invention. In this drawing, a reference numeral 43 indicates a power source battery; 110 indicates a main switch provided on the rear housing 21; 114 indicates a switch which is normally closed and is turned off by the first stroke of a shutter button 22; 111 indicates a switch which is normally open and is turned on by the second stroke of the shutter button 22; 112 indicates a relay switch which is normally in an off state and is turned on by the excitation of an electromagnet 115 and another electromagnet 116; 59 indicates a shutter full opening switch which is normally in an on state and is turned off only when the shutter is in a fully opened state; 60 indicates a shutter closing switch which is in an on state when the shutter is closed and is turned off when the shutter is opened even to a slight degree; and 113 indicates a control circuit for controlling a known half-opening type shutter, the control circuit 113 works to cut off power supply to an ampere meter 58 when the quantity of light received by the light receiving element reaches a preset value.

A differentiation circuit is formed by resistances 117 and 119 and a capacitor 118. The differentiation circuit is connected to the trigger terminal of a monostable multivibrator 120.

The operation of the shutter control device and that of the sheet-like photosensitive material carrying out device of the invented camera will be understood from the following description with reference to FIG. 1 through FIG. 5: First the power source switch 110 is turned on. Next, the shutter button 22 is depressed. Then, the switch 114 is turned off by the first stroke of the shutter button. With the shutter button then further depressed, the switch 111 is turned on by the second stroke of the shutter button 22. By this, an electric power is supplied to the shutter control circuit 113. With the power supplied to the shutter control circuit 113, the ampere meter 58 is supplied with the power and the moving coil of the ampere meter 58 rotates. Then, the lever 57 rotates clockwise to a degree corresponding to the degree to which the moving coil rotates. The clockwise rotation of the lever 57 causes the shutter blade 52 to rotate clockwise and the shutter blade 51 to rotate counterclockwise against the force of the spring 52' respectively. The shutter is opened and an exposure process commences. Concurrently with this, the auxiliary diaphragm portions 77 and 77' begin to open and the light receiving element 75 disposed behind the auxiliary diaphragm portions receives light. When the integration quantity of light received by the light receiving element 75 reaches a preset value (or optimum value of exposure), the known shutter control circuit 113 shuts off the power supply to the ampere meter 58. Then, the shutter blades 51 and 52 are rotated by the urging force of the spring 52' in the directions opposite to the directions in which they have rotated for opening and thus the shutter is closed. Further, when the switch 111 is turned on by the second stroke of the shutter button 22, an electric circuit is also supplied to the electromagnet 115. With the electromagnet thus excited, the switch 112 is kept in a state of being turned on by the excitation of the electromagnet 115. Therefore, the power supply to the ampere meter 58 is not cut off even if the shutter button is relieved from the condition of being depressed immediately after the depression of the button, so that the power supply to the ampere meter 58 can be maintained until the integration quantity of light received by the light receiving element 75 reaches a preset value. Furthermore, while the power is supplied to the ampere meter 58, the switch 60 is in an off state as the shutter is open. Therefore, even if the switch 114 is turned on with the shutter button 22 is relieved from its state of being depressed, no power will be supplied to the motor 81. This precludes any possibility that the sheet-like photosensitive material 200 is taken out while the material is exposed to light.

When the power supply to the ampere meter 58 is cut off to close the shutter and when the switch 60 is thereby turned on, the photosensitive material carrying motor 81 is caused to rotate by a signal produced by the closure of the switch 60. The rotation of the motor 81 causes the wheel 83 to rotate clockwise through the worm wheel 82. The rotation is further transmitted through the toothed wheels 92, 93, 94 and 95 to cause the pressing roll 32 to rotate counterclockwise and the pressing roll 33 to rotate clockwise. With the wheel 83 rotated, the lever 87 begins to move in the direction in which the photosensitive material is taken out. The claw 87' of the lever 87 then engages with the guide tab 97 of the sheet-like photosensitive material 200 to carry the sheet-like material 200 until it is inserted in between the pressing rolls 32 and 33. The sheet-like material which has been carried to the rolls 32 and 33 is then caused by the rolls 32 and 33 to move to the outside of the rear housing 21 through the photosensitive material discharge port 99. The sheet-like photosensitive material 200 undergoes a self-development process while it is being caused to move to the outside of the rear housing by the pressing rolls 32 and 33.

The toothed wheels 92, 93, 94 and 95 are arranged in such a manner that, when the wheel 83 makes one turn, one sheet of the sheet-like photosensitive material 200 completes the self-development process and is carried to the outside of the rear housing. With the toothed wheel 83 completing one turn, then the pin 85 provided on the wheel 83 pushes one of the electrode contact pieces of the switch 86 to turn off the switch. By this, the power supply to the motor 81 is cut off to complete a photosensitive material carrying operation.

The power supply to the motor 81 is controlled in the following manner: When the power supply to the ampere meter 58 is cut off, the shutter is closed and the switch 60 is turned on to effect power supply to the motor 81. With the switch 60 turned on, a differential pulse is arranged to be supplied to the gate terminal of the monostable multivibrator 120 while the motor 81 is arranged to rotate when the output voltage of the monostable multivibrator 120 rises for some period of time. Accordingly, with the switch 60 turned on and the output voltage of the monostable multivibrator 120 rising for a while and with the motor being caused to rotate to a certain degree, the pin 85 of the toothed wheel 83 is disengaged from the electrode contact piece of the switch 86. The switch 86 is kept in its on state by this and the motor 81 continues to rotate. However, when the toothed wheel 83 which is being rotated by the motor 81 makes one turn and, again, the pin 85 on the toothed wheel 83 is brought into contact with the electrode contact piece of the switch 86, the switch 86 is turned off whereby. Then, since the monostable multivibrator 120 is arranged to be turned off a little while after the switch 86 is turned on, the motor 81 is completely stopped with the switch 86 being turned off.

The foregoing has described the operation of the invented camera covering the operation of the electrical circuit in the case where the shutter button 22 is relieved from its state of being depressed while an exposure operation is being carried out for a long period of time with the shutter fully opened. However, in cases where the shutter button is relieved from depression after commencement of a shutter operation and before the shutter is fully opened, i.e. before the switch 59 is turned off, the shutter operation is carried out without any trouble because: In the same manner as in the case described in the foregoing, the switch 112 is kept in a state of being turned on by the electromagnet 115 which receives power supply concurrently with commencement of the shutter operation and continuously receives the power supply until the optimum exposure is made.

In cases where the photographing object is dark requiring exposure for a long period of time, the power supply continues with the switch 112 being kept in an on state as mentioned in the foregoing and the shutter comes to be fully opened. Then, the subsequent operation is accomplished in exactly the same manner as described in the foregoing. Furthermore, in such a case, power supply to the electromagnet 116 while the shutter is fully opened (for a long period of time) is prevented by the switch 59 in the same manner as in the case described in the foregoing, so that the power supply can be prevented from being wasted.

On the other hand, where the photographing object is bright and exposure is accomplished in a brief period of time, the switch 112 is kept in an on state until the light to which the exposure is made reaches an optimum quantity, so that correct exposure control can be accomplished. Further, since the shutter is not fully opened, the switch 59 is kept in an on state. As a result of this, the switch 112 is kept in its on state by the electromagnet 116 even after the shutter is closed. Therefore, when the switch 60 is turned on by the closing of the shutter, power is supplied to the motor 81 through the switches 112 and 114 and the sheet-like photosensitive material is carried out in the same manner as described in the foregoing.

In cases where the shutter button is continuously depressed after the shutter is closed, the switch 111 is left in an off state because the shutter button is kept depressed. Under such a condition, power is supplied to the ampare meter 58 without fail during the opening and closing operation of the shutter. However, since the shutter button is not returned into its original position, the switch 114 is left in its off state even when the shutter closing switch 60 is turned on with the shutter being closed. Therefore, power is not supplied to the motor 81 and the photosensitive material carrying operation does not take place. When the finger which has been depressing the shutter button 22 is detached from the shutter button, the switch 114 is turned on to supply a differential pulse to the trigger terminal of the monostable multivibrator 120. Then, the monostable multivibrator works to commence power supply to the motor 81 and the photosensitive material carrying operation begins. After that, the sheet-like photosensitive material is carried to the outside in the same manner as described in the foregoing. In other words, in such a case, the photosensitive material carrying operation begins after the finger is detached from the shutter button. In all of the cases described in the foregoing, the photosensitive material carrying operation is accomplished without any trouble even if the shutter button is depressed during the photosensitive material carrying operation, because: Once the shutter is operated, the switch 110 is kept in an on state as long as the power source switch 110 is in an on state. Thus, there is no possibility that the shutter control circuit 113 is returned to its original state. The shutter is never opened or closed during the sheet-like photosensitive material carrying operation even if the switch is again turned on by the depression of the shutter button 22. Further, the sheet-like photosensitive material carrying circuit is arranged in such a manner that: When the switch 114 is turned off by the depression of the shutter button, if the switch is turned on after the shutter button is relieved from the depression, the power supply to the motor 81 is resumed either through the switch 86 which has been already turned on or through the monostable multivibrator to accomplish the photosensitive material carrying operation.

Figure 6:
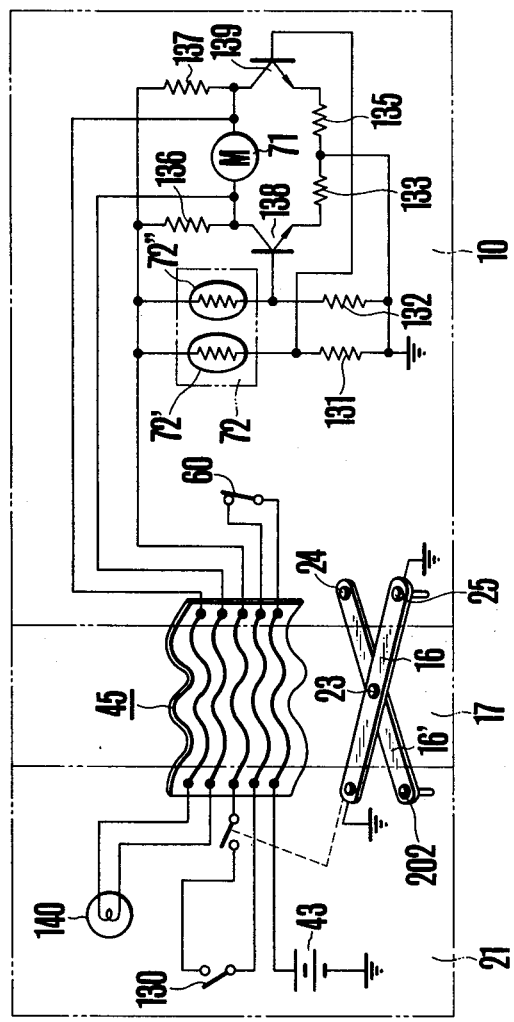
FIG. 6 illustrates a control circuit which is provided for controlling the automatic focussing device illustrated in FIG. 3 and the locations and electrical connections of parts included in the control circuit.

FIG. 6 illustrates a control circuit employed for controlling the automatic focussing device which is incorporated in the invented camera and which is shown in FIG. 3 and also illustrates the relative positions and electric connections of parts included in the control circuit. In FIG. 6, a reference numeral 72 indicates a light receiving element which is provided for detecting focus and which is shown in FIG. 3. The light receiving element 72 is formed with photo-conductive matters 72' and 72" disposed at different distances from the image forming lens 13. When the image forming lens 13 focuses at a preset point, the resistance values of the photo-conductive matters 72' and 72" become equal. When it focuses at a nearer point, the resistance value of the photo-conductive matter 72' is greater than that of the matter 72" and when it focuses at a longer distance, the resistance value of the matter 72" is greater than that of the matter 72'. The construction of the light receiving element 72 is as disclosed in Japanese Patent Application Laid-Open No. 117,419-1975. Reference numerals 138 and 139 indicate transistors which form a differential amplifier and the differential output of the amplifier is applied to a motor 71; and 131, 132, 133, 135, 136 and 137 indicate resistances which are arranged to have no current flow to the motor 71 when the resistance values of the above stated photo-conductive matters 72' and 72" become equal to each other, i.e. when focussing is made. When an image is formed on the light receiving element 72 by the image forming lens 13 and if the image is focussed at a nearer distance and thus the resistance value of the photo-conductive matter 72' becomes greater than that of the matter 72", the transistor 138 is turned on; transistor 139 is turned off; a current flows to the motor 71 through the resistance 137, the transistor 138 and the resistance 133; and the motor then rotates counter-clockwise. When the resistance value of the photo-conductive matter 72' becomes smaller than that of the photo-conductive matter 72", the transistor 138 is turned off; the transistor 139 is turned on; a current flows to the motor 71 through the resistance 136, the transistor 139 and the reference 135; and the motor rotates clockwise. A reference numeral 140 indicates a lamp which is provided for indicating that the automatic focus detection device is in operation. When focussing is made, the transistors 138 and 139 are turned off to cut off the power supply to the motor 71, the lamp is put out, the lamp being disposed within the visual field of the view finder; and 45 indicates an electric wiring board which is firmly stuck to the bellows 17. As illustrated in FIG. 6, the electric wiring board electrically connects components disposed inside the front housing to components disposed inside the rear housing. Referring now to FIGS. 3 and 6, the operation of the automatic focussing device applied to the camera of this invention is described as follows:

The automatic focussing device used for the invented camera is operated prior to a shutter button 22 depressing operation. Accordingly, under such a condition, the shutter is completely closed and the switch 60 is in an on state. First, the connecting device is stretched out and the main switch 110 is turned on. Then, the control button 203 is depressed to turn on the switch 130. By this, power is supplied to the automatic focussing circuit. After actuation of the automatic focussing circuit, if the image is out of focus and the focus is at a nearer point, the motor 71 is rotated counterclockwise. The motor rotation is transmitted to the toothed wheel 68 of the lens barrel of the image forming lens 13 through the toothed wheels 70 and 69. This causes the image forming lens barrel to rotate to move the image forming lens 13 backward. With the image forming lens moved backward, the lens comes to form the image at a preset position on the light receiving element 72. The resistance values of the two photo-conductive matters 72' and 72" then become equal to each other to cut off the power supply to the motor 71. On the other hand, the rotation of the motor 71 is also transmitted to the toothed wheels 67 and 66, the rack 64 and the toothed wheels 63 and 62 to cause the lens barrel 11A of the photographing lens to rotate at the same time. This causes the photographing lens 11 to move backward in proportion to the image forming lens 13. In this manner, when the image forming lens 13 is adjusted to a focussed condition, the photographing lens is also adjusted to ensure correct focussing on the surface of the photosensitive material. On the other hand, when the focus is on a point at a longer distance than the preset point, the motor is caused to rotate clockwise until the power supply to the motor 71 is cut off. Then, the image forming lens 13 and the photographing lens 11 are moved forward to accomplish the automatic focussing in the same manner as in the case of focus on a point at a nearer point. Upon completion of the automatic focussing, the lamp 140 is put out to inform the operator of the completion of the automatic focussing, so that the operator can start photographing by operating the shutter button 22.

During the automatic focussing detecting operation, the operator must continue to depress the above stated start button 23. Furthermore, the automatic focussing detection device never operate while the shutter is open because the shutter closing switch 60 is turned off when the shutter is opened. This prevents any erroneous operation of the automatic focussing detection device during a shutter operation.

Figure 7:
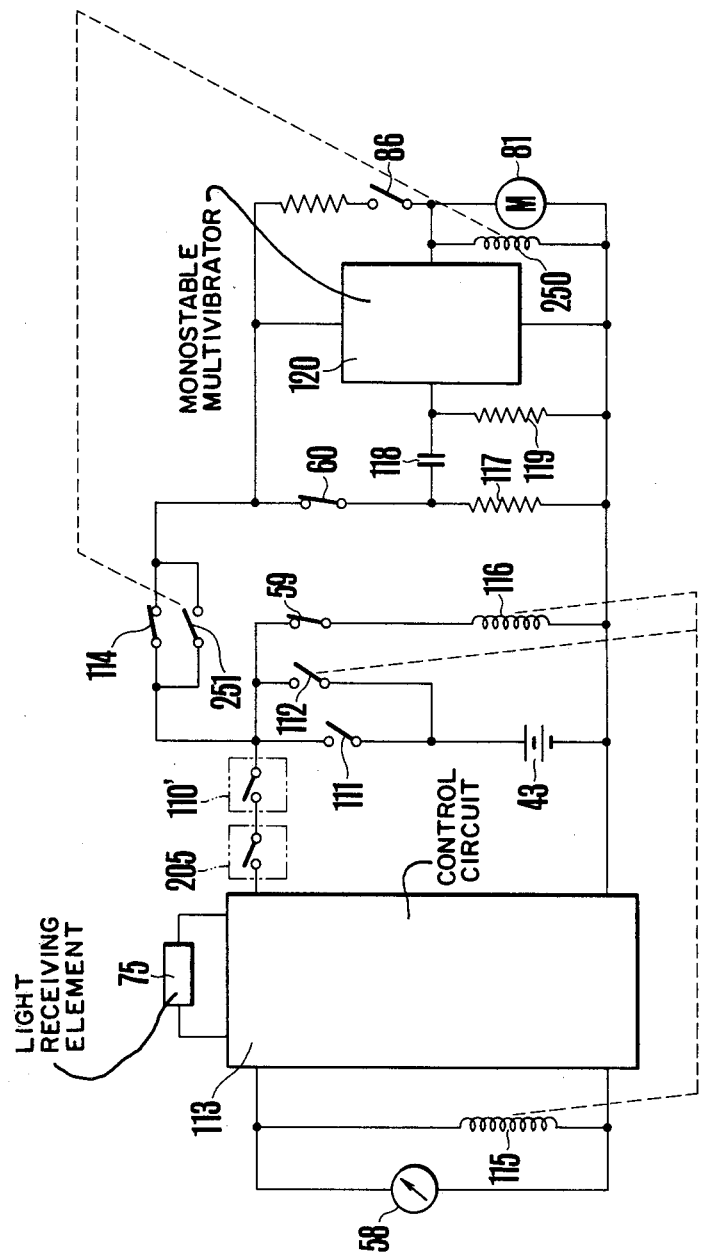
FIG. 7 illustrates a modification of the control circuit illustrated in FIG. 5 as another embodiment example.

FIG. 7 illustrates another embodiment example representing a modification of the control circuit illustrated in FIG. 5. In this embodiment, an electromagnet 250 is connected in parallel (or if so desired in series) to a motor 81. When a power is supplied to the electromagnetic 250, a switch 251 is turned on. After the motor 81 is started, the connection is maintained until completion of a photosensitive material carrying operation even if the shutter button is depressed again, so that a developing solution can be homogeneously applied without fail to the sheet-like photosensitive material. In other words, in accordance with this embodiment example, even when the camera is folded immediately after the shutter operation, the power supply to the photosensitive material carrying device is maintained until completion of the photosensitive material carrying operation. A reference numeral 205 indicates a switch which is also shown in FIG. 8.

Figure 8:
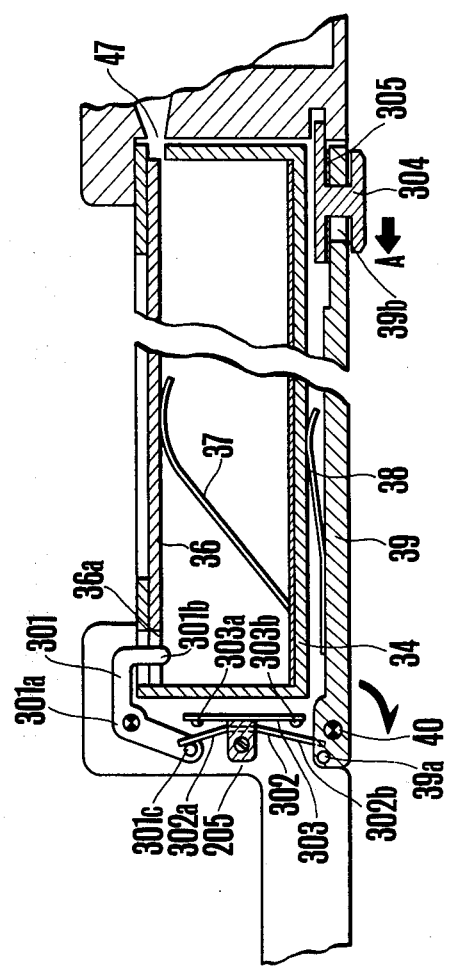
FIG. 8 is a sectional side view illustrating the structure and details of a safety device to be applied to the camera of this invention.

FIG. 8 is a sectional view illustrating in detail the construction of a safety device applicable to the camera of this invention. In FIG. 8, a reference numeral 301 indicates a lever which is provided for detecting the existence or nonexistence of a photosensitive material; 301a indicates the rotating shaft of the lever 301; 301b indicates a protrudent part of the lever provided for detection; and 301c indicates a switch operating pin. Reference numerals 302 and 303 indicate contact pieces which form a switch 205 which is normally opened; and 39 indicates a rear lid provided for insertion and removal of a cartridge. In the vicinity of a rotating shaft 40, there is provided a switch operating pin 39a as shown in the drawing. At the right end part of the lid 39, there is provided a long groove 39b with a rear lid locking member 304 movably fitted therein. The locking member 304 is frictionally retained in position by a friction giving member 305.

With the safety device of this invention arranged as described in the foregoing, when the camera is loaded with a cartridge which is containing a sheet-like photosensitive material 200 therein, the part 301b of the detecting lever 301 is pushed by the sheet-like photosensitive material 200. The part 301b in turn causes a part 302a of the contact piece 302 to come into contact with a part 303a of the other contact piece 303 against the spring force of the contact piece 302. When the sheet-like photosensitive material 200 is contained in the cartridge 34, therefore, power supply to each component of the camera is made possible through the above stated arrangement to enable each component to operate. When there is no sheet-like photosensitive material inside the cartridge, the spring force of the contact piece 302 is urging the detecting lever 301 to rotate clockwise. Meanwhile, in the photosensitive material pressing plate 36 which is mentioned in the foregoing, there is provided a notch 36a at a position corresponding to the part 301b of the lever 301. The lever 301, therefore, rotates to a position as illustrated in FIG. 8 without opposing the spring force of the contact piece 302. By this, the parts 302a and 303a of these contact pieces are disengaged from each other to cut off the power supply to each component of the camera. Further, exactly the same condition obtains in cases where the camera is not loaded with the cartridge 34.

When it is desired to test the operation of each component of the camera, the rear lid locking member 304 is slided in the direction of arrow and the cartridge 34 is taken out by opening the rear lid 39. When the rear lid 39 is opened, the pin 39a of the lid 39 bends the part 302b of the contact piece 302 to the right against the spring force of the piece 302 to bring the part 302b into contact with the part 303b of the contact piece 303. Under such a condition, the operation of each component of the camera can be tested with the rear lid 39 opened and with the cartridge 34 removed (and of course with the sheet-like photosensitive material 200 also thus removed from the camera). This arrangement thus permits testing each component of the camera without wasting the sheet-like photosensitive material 200. This also readily enables the operator to check for correct focussing of an image of a photographing object on the image forming plane by the automatic focussing detection device or to check for accurate operation of the exposure control device.

As described in the foregoing, in accordance with this invention, a camera that is foldable into a thin flat shape for improved portability can be obtained even when there are provided on the side of the photographing lens in the front housing many devices required for driving or controlling the various functions of the camera. The camera also obviates the necessity of complex mechanisms and parts otherwise required for connecting the camera body (or the rear housing 21) to the front housing 10 containing the photographing lens. This is a great advantage for actual applications. Further, when the camera is not loaded with the sheet-like photosensitive material 200 or when the front housing is not correctly pulled out thus making photographing in focus impossible, the operation of each component of the camera is prohibited by the arrangement of the switch 110. With such arrangement, the photographer is immediately informed of such incomplete preliminaries, so that the power source can be prevented from unnecessary wasting of power. In addition to the above mentioned advantages, it is also a great advantage not only to a buyer but also to the manufacturing processes that the operation of each component of the camera can be tested with the rear lid 39 opened.

What is claimed is:

1. A camera comprising:
   (a) a housing having a film-receiving chamber for loading a film which has a loading opening through which the film is loaded and a battery-receiving chamber for containing a power source battery;
   (b) an opening and closing cover to selectively cover said film loading opening;
   (c) a driving means to receive the power supplied from said battery for driving and advancing the film loaded into said chamber, wherein said means is electrically connected to said battery;
   (d) a detecting means in said housing to automatically detect an absence of said film in said film-receiving chamber;
   (e) a first switch in said housing to respond to said detecting means for releasing the electric connection between said driving means and said battery; and
   (f) a second switch in said housing for testing which makes said electrical connection between said driving means and said battery without any relationship with said switch in response to an opening action of said opening and closing cover.

2. A camera of a self-development processing type to conduct an exposure and a development processing on a plurality of sheet-like film housed in a cassette one by one, in which the film has a development processing solution storing means and forms, after exposure to light, a visible image through a development process carried out with the development processing solution contained in said storing means, also the cassette has a detection opening to detect whether said film exists in the cassette and a film exposure opening as well as a taking out opening through which an exposed film is taken out, wherein said camera comprises:
   (a) a housing, having:
   a cassette-receiving chamber for loading the cassette, wherein said chamber has an opening to load and unload said cassette; and
   a battery-receiving chamber for containing a power source battery;
   (b) a cover to selectively cover the cassette loading and unloading opening of said cassette-receiving chamber;
   (c) a photographic optical means in said housing to expose the film emerging at the film exposure opening of the cassette loaded into said chamber;
   (d) carrying means in said housing for advancing said exposed film through said taking out opening of said cassette to outside of said housing and processes said exposed film with said development processing solution in a course of said advancing, wherein said means includes:
   a motor which is driven by receiving power supply of said battery contained in said battery-receiving chamber;
   a pair of pressure roller members placed at such position as facing said taking out opening of the cassette loaded into said cassette-receiving chamber; wherein said member is operatively coupled with said motor and rotates receiving the driving power of said motor in such manner that said film which has been carried from the cassette can be pulled into between said pressure roller members; and
   a means to carry said exposed film within said cassette to between said pressure roller members through said taking out opening;
   (e) a detecting means in said housing to detect automatically an absence of the film within the cassette loaded into said film-receiving chamber, wherein said means has a detecting portion which protrudes from said detection opening of the cassette loaded into said film-receiving chamber into said chamber;
   (f) an urging means in said housing which always biases said detecting portion of said detecting means in an internal direction of said cassette;
   (g) a first switch in said housing which responds to said detecting means and releases said electric connection between said motor and said battery; and
   (h) a second switch in said housing for testing which responds to an opening action of said opening and closing cover and makes said electric connection between said motor and said battery without any relationship with said first switch.

3. A camera comprising:
   (a) a rear housing for mounting a power source battery including:
   a housing having a film-receiving chamber for loading a film;
   connector means to guide the power of the battery to outside of the rear housing, wherein one end of said means is electrically connected with said battery;
   (b) a front housing including:
   an automatic focusing device;
   connector means to input the power to activate said automatic focusing device from outside of the front housing device, wherein one end of said means is
   electrically connected with said automatic focusing device; and
   (c) a connecting device which connects said rear housing to said front housing, the connecting device including:
   bellows which shields from light a space formed between said rear housing and said front housing;
   folding means which controls the extension and contraction of said bellows to permit adjustment of the distance between the rear and front housing to a distance suitable for photographing and also to permit bringing the rear and front housings into close contact with each other to make the camera into a shape suitable for carrying; and
   a flexible wiring board to electrically connect said battery of the rear housing with said automatic focusing device of the front housing;
   wherein said board is tightly stuck with said bellows and has one end electrically connected with the other end of said connector means of the rear housing and has the other end electrically connected with the other end of said connector means of the front housing, respectively, and wherein said folding means is provided with a main switch operating means which closes a main switch disposed inside said rear housing when said bellows is stretched out.

4. A camera according to claim 3 wherein said automatic focussing device is provided with a display means which indicates the focussing state of the automatic focussing device inside a view finder provided in said rear housing.

5. A camera according to claim 3 wherein said rear housing is provided with a switch means which prevents electric current supply from said power source battery to other components of the camera when the rear housing is not loaded with said photosensitive material.

6. A camera according to claim 5 wherein said rear housing is provided with a releasing means which selectively makes said switch means inoperative.

7. A photographic camera comprising:
(a) a rear housing for mounting a power source battery including:
a housing having a photosensitive material-receiving chamber for loading a photosensitive material; and
connector means for guiding the electrical power of the battery to outside of the rear housing, wherein one end of said means is electrically connected to said battery;
(b) a front housing including:
a housing;
photographic optical means in said housing for having an object light being impinged imaged on the photosensitive material loaded into the chamber of the rear housing;
means in said housing to limit said object light impinging on the photosensitive material through said photographic optical means, wherein said limiting means has at least one movable member which moves so as to cross an optical path of said photographic optical means;
control means in said housing to control the impinging amount of said object light, having a photoelectric transducer in said housing to provide an electrical signal which is proportional to an amount of said object light reaching said photosensitive material through said photographic optical means and a control circuit means in said housing to control said movable member in response to the output of the photoelectric transducer; and
connector means to secure the power to activate said control means from outside of the front housing, wherein one end of said connector means is electrically connected to said control means; and
(c) a connecting device which connects said rear housing to said front housing, the connecting device including:
a bellows which shields from light a space formed between said rear housing and said front housing;
folding means which controls the extension and contraction of said bellows to permit adjustment of the distance between the rear and front housings to a distance suitable for photographing and also to permit bringing the rear and front housings into close contact with each other to make the camera into a shape suitable for carrying; and
a flexible wiring board to have said battery of the rear housing electrically connected with said control means of the front housing, wherein said board is tightly stuck in said bellows and has its one end connected with the other end of said connector means of the rear housing further has the other end connected with the other end of said connector means of the front housing, respectively, and
wherein said folding means is provided with a main switch operating means which closes a main switch disposed inside said first device when said bellows is stretched out.

8. A photographic camera according to claim 7 in which the front housing includes an automatic focussing device and the connector means supplies a power to activate the automatic focussing device.

9. A photographic camera according to claim 3 or 7, wherein said means to limit object light has an electric shutter having said movable member as a light shielding member.

10. A photographic camera according to claim 3 or 7, wherein said means to limit object light has a diaphragm device having said movable member as a diaphragm member.

11. A camera comprising:
(a) a front housing including:
exposure control means which is electrically operated to control exposure to light of a surface of a photosensitive material to be exposed to light;
(b) a rear housing to be loaded with said photosensitive material, the rear housing including:
a power source battery;
means for controlling electric current supply to said exposure control means, said means being electrically connected with said battery; and
a switch to release said electrical connection between said battery and said control means; and
(c) a connecting device which connects said front housing to said rear housing, the connecting device including:
bellows which shields from light a space formed between said front housing and said rear housing;
a flexible wiring board which is tightly stuck to said bellows to electrically connect said exposure control means of the front housing to said controlling means of the rear housing; and
folding means which controls the extension and contraction of said bellows to permit adjustmen of the distance between the front and rear housings to a distance suitable for photographing and also to permit bringing the front and rear housings into close contact with each other to make the camera into a shape suitable for carrying, said folding means being provided with a switch operating means for closing said switch when said bellows is stretched out.

* * * * *